United States Patent
Johnson et al.

(10) Patent No.: US 7,612,661 B1
(45) Date of Patent: Nov. 3, 2009

(54) DYNAMIC MESSAGES

(75) Inventors: David K. Johnson, Waukesha, WI (US);
Eric G. Dorgelo, Port Moody (CA);
Kenwood H. Hall, Hudson, OH (US);
Jan Bezdicek, Prelouc (CZ); Dale Robert Sapach, Roberts Creek (CA);
John J. Baier, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 405 days.

(21) Appl. No.: 11/537,239

(22) Filed: Sep. 29, 2006

(51) Int. Cl.
*G08B 1/00* (2006.01)

(52) U.S. Cl. .............. 340/531; 340/7.51; 709/217

(58) Field of Classification Search .......... 340/531, 340/533, 539.1, 506, 7.2, 7.43, 7.45, 7.51, 340/7.53, 7.55–7.62; 455/404.1, 414.4; 379/37; 709/217, 219, 220, 230
See application file for complete search history.

(56) References Cited

U.S. PATENT DOCUMENTS

| | | | |
|---|---|---|---|
| 4,570,217 A | 2/1986 | Allen et al. | |
| 5,867,097 A | 2/1999 | Jung et al. | |
| 5,886,622 A | 3/1999 | Snyder | |
| 6,233,317 B1 * | 5/2001 | Homan et al. | 379/88.05 |
| 6,437,812 B1 | 8/2002 | Giles et al. | |
| 6,542,075 B2 * | 4/2003 | Barker et al. | 340/506 |
| 6,737,966 B1 | 5/2004 | Calder | |
| 7,103,427 B2 * | 9/2006 | Dillon | 700/83 |
| 7,262,690 B2 * | 8/2007 | Heaton et al. | 340/506 |
| 7,391,314 B2 * | 6/2008 | Lemmon | 340/506 |
| 2002/0173304 A1 * | 11/2002 | Horompoly | 455/426 |
| 2003/0025599 A1 * | 2/2003 | Monroe | 340/531 |
| 2006/0136583 A1 * | 6/2006 | Helmstetter et al. | 709/224 |
| 2006/0253539 A1 * | 11/2006 | Casperson et al. | 709/207 |

* cited by examiner

*Primary Examiner*—Thomas J Mullen
(74) *Attorney, Agent, or Firm*—Turocy & Watson LLP; William R. Walbrun

(57) ABSTRACT

Systems and methods that dynamically generates alarms in real time are disclosed. An interface component receives instructions for generating alarms. A builder component dynamically creates alarms in real time based on instructions received and information stored on a data repository. The information comprises at least one or more of user roles, language spreadsheet and device characteristics. The system can further comprise a publisher component that packages alarms for delivery to web servers and/or another network. A proxy component for implementing the subject invention with legacy controllers is also disclosed.

18 Claims, 11 Drawing Sheets

600 →

```
TIME STAMP                          LANGUAGE
  19:34                              ENGLISH

NATURE OF ALARMS
                  ..
                  ..
```

```
TIME STAMP                          LANGUAGE
  07:34                              JAPANESE

NATURE OF ALARMS
              (IN JAPANESE)
                  ..
                  ..
```

FIG. 7

DYNAMIC MESSAGES

TECHNICAL FIELD

The claimed subject matter relates generally to industrial processes and, more particularly, to dynamically formatting alarms associated with one or more industrial processes in real time.

BACKGROUND

Due to advances in computing technology, businesses today are able to operate more efficiently when compared to substantially similar businesses only a few years ago. For example, networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. The system alarms can be presented to machine users to communicate operating conditions.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, generate a message, an alarm or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Conventionally, in order to generate customized alarms or messages, alarm formats must be setup or defined a priori by an operator or other individuals with knowledge of the process. For example, it may be desirable to format the alarms in the language of Spanish for a certain time shift when a Spanish-speaking operator is working at a particular machine or overseeing a certain process. Problems can arise, however, if the work schedule of the operator is altered. For instance, ideally the Spanish-speaking operator follows strictly to his/her work schedule, such that alarms in Spanish language type are presented to the operator at his scheduled work hours. If, however, the Spanish-speaking operator is absent due to an unforeseen circumstance, a substitute operator might not understand the alarms in Spanish language.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Generating alarms associated with an industrial process is an extremely important task. For instance, it is often desirable to generate alarms whenever errors occur in a process (e.g., to ensure all related personnel are notified). The claimed subject matter described herein relates to automatically and dynamically generating alarms on the fly associated with respect to industrial processes. To that end, instructions to generate alarms can be received by an interface component. Alarm formats and styles are determined according to information such as user roles, device characteristics, user language preferences, geographic location, etc. A builder component can then dynamically create alarms in real time based at least on the instruction received and information stored on a data repository. Creating alarms can include at least formatting and packaging alarms for delivery to appropriate recipients. Alarms can be formatted in various colors, languages, graphical presentations, recipient device formats, time zone, etc. to tailor to at least one or more of recipients' job function, geographic location, and preference.

A relevance component can be utilized to further prioritize alarms based on one or more of time sensibility of alarms, events associated with the alarms, recipients' response to prior alarms, etc. The relevance component can cause alarms with higher priority to be presented with higher emphasis or increase the frequency of presentation to users. For example, alarms formatted in connection with a high priority can be provided frequently to a user given an approaching deadline.

Additionally, a publisher component can further package alarms for delivery to a web server, provides access to the Internet. Thus, alarms can be delivered to users through the Internet or an intranet. Also disclosed herein is a bridge component, which can act as an intermediary between two or more networks or network protocols. For example, an alarm generated in a local factory that utilizes a certain protocol can be modified so that it can be delivered and interpreted by a device that is associated with a different network protocol.

Further, a proxy component can also be implemented to establish compatibility with legacy controllers to save time and cost in upgrading a system and still achieve the advantages of dynamic alarm generation. The proxy component can receive generic alarms generated by the legacy controller as instructions for dynamic alarm generation. The proxy component can then dynamically format and package alarms in real time based at least upon the instruction received and information stored in a data repository.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become

BRIEF DESCRIPTION OF THE DRAWINGS

FIG. 6 illustrates an alarm displayed in a type of format.
FIG. 7 illustrates an alarm displayed in a different type of format from the one in FIG. 6.

DETAILED DESCRIPTION

Figure 1:
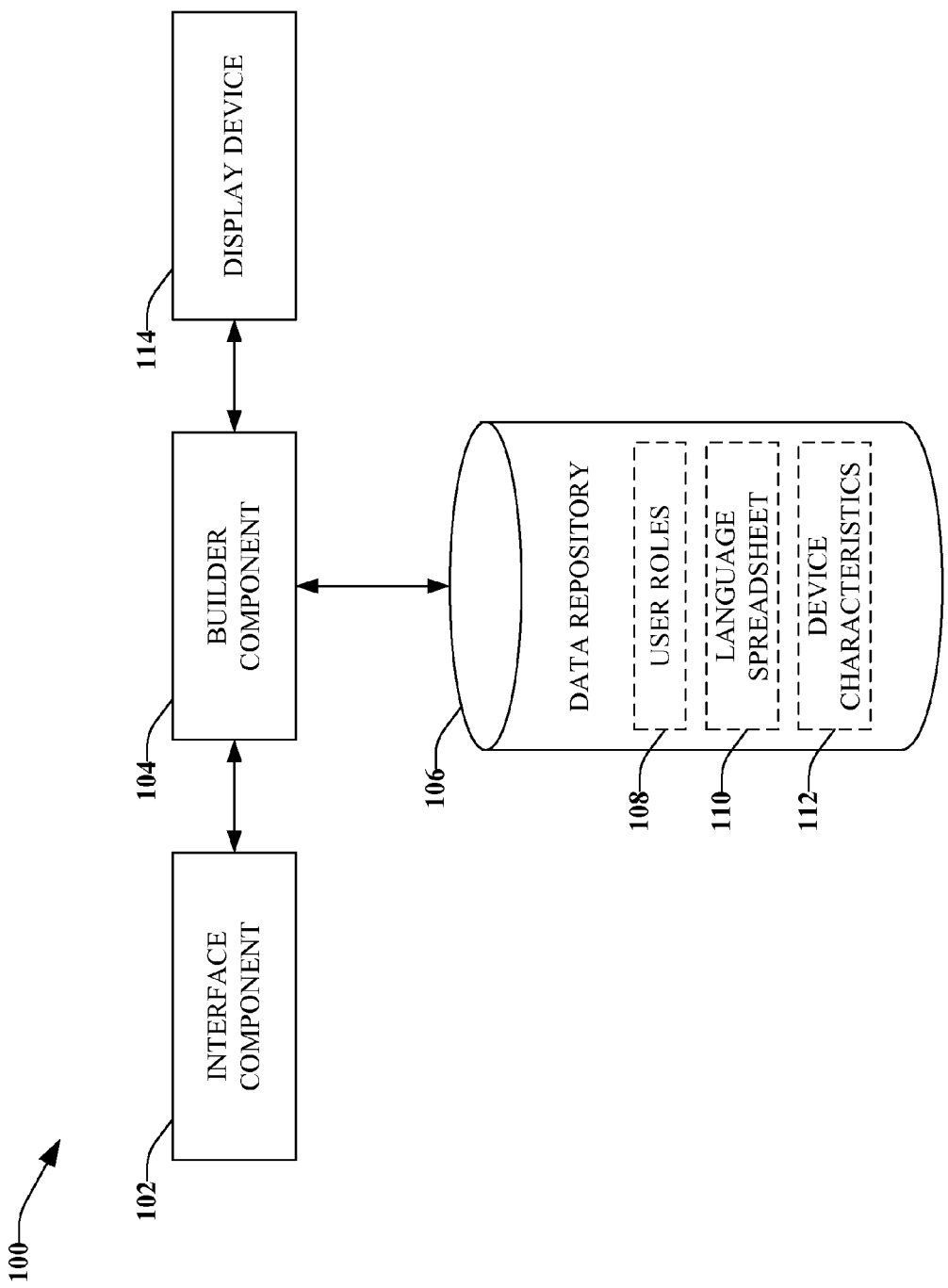
FIG. 1 illustrates an alarm configuration system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates an alarm configuration system 100 that can be utilized in an industrial environment. The alarm configuration system 100 includes an interface component 102 that receives instructions to generate an alarm. For example, an industrial controller may encounter an error and the interface component 102 receives the instruction to generate an alarm from the controller to notify an operator of the error. For instance, the error may be a process variable lying outside of a predefined range, receipt of certain user input (such as depression of an emergency stop button), and the like. The interface component 102 can receive input from various sensors, controllers, high-level systems, or other suitable devices/entities that can cause generation of one or more alarms.

Upon the interface component 102 receiving data that may initiate an alarm, a builder component 104 communicatively coupled thereto can respond to data received from the interface component 102 and dynamically generate an alarm by accessing data from within a data repository 106. Generating an alarm can include formatting and packaging the alarm in real time. It can also be appreciated that the builder component 104 can dynamically generate one or more alarms for one or more different recipients.

The builder component 104 can dynamically format alarms according to various factors such as user identity, user role, geographic location, recipient, etc. For example, the builder component 104 can format an alarm in English for an English-speaking operator and format another alarm associated with a similar issue in Japanese for delivery to a Japanese engineer. It can also be appreciated that different format types can include color types, graphical presentations, quantity of alarm information or combinations of any of the above. For instance, an alarm can be generated in red color to represent a higher level of urgency as compared to a green color alarm which may be associated with less urgency.

The builder component 104 can also format alarms according to how a recipient is to be notified, such as HMI display, phones, pagers, emails, public announcement system, text messaging, etc. For example, a generated alarm desirably provided to several individuals can be formatted to display on a cell phone for one individual, on a larger HMI display for another individual, and formatted for a public announcement system in a manufacturing plant to reach a third individual. Thus, customized alarms can be automatically generated based at least in part upon data relating to the alarm and/or the user.

The builder component 104 can generate alarms dynamically utilizing data from a data repository 106, which retains information for dynamically generating alarms. This information can include user roles 108, language spreadsheets 110, device characteristics 112, and other suitable information. The user roles 108 can include user profiles for personnel of a plant, wherein the profiles can comprise a user name, user job function (executive, engineer, plant manager, device operator), user location, preferred language, skill level, user preferences, privileges with respect to certain data, department of the user, and other user characteristics. The user roles 108 can be accessed by the builder component 104 upon receipt of an indication that an alarm should be generated to dynamically format alarms. Thus, alarms can be personalized for each recipient in an extremely granular manner, such as based upon user preference (which may change with altering context). For example, an alarm containing a brief summary of daily production yield can be generated for a company chief executive operator given a certain event; while another alarm is generated for a production engineer (with respect to the same event) containing not only a brief summary of daily production yield but also detailed data regarding production efficiency of multiple lines of production.

The data repository 106 also includes the language spreadsheet 110, which can hold various language types/translations for alarm formatting (e.g. Spanish, French, English, Japanese, German, . . . ). For example, the builder component 104 can retrieve a user profile from the user roles 108 with respect to an operator currently working on a machine, and can determine a preferred language type from the user profile of the operator. The builder component 104 can then format alarms in the preferred language type by utilizing the language spreadsheet 110 resident in the data repository 106. Pursuant to an example, the language spreadsheet 110 can include Unicode strings that can be graphically rendered by an Internet browser, a word processor, or other suitable program. It can also be appreciated that the language spreadsheet 110 can retain industrial terminologies that are associated with different applications. For example, an operator in a batch processing environment may utilize different terminology when compared to terminology employed by an operator in a continuous processing environment.

Further, the data repository 106 also can retain device characteristics data 112, which can include information pertaining to characteristics of various recipient devices of alarms. Device characteristics can include device type, display type, screen real-estate, screen resolution, processing capabilities, software available on a display device, color capabilities, notification type, memory capacity, communication protocol, etc. The builder component 104 can generate an alarm in a format that is compatible with a respective recipient display device 114. For instance, an alarm desirably transmitted to a cell phone can be formatted as a wireless text message while an alarm to be displayed on a robust HMI display can be formatted according to display screen size and resolution. The device characteristics data 112 can also retain notification methods for each device. For example, a mobile phone can have several notification methods associated therewith, such as ringing, beeping, vibrating, flashing LED, flashing text messages or combinations of the above. Thus, the builder component 104 can retrieve device characteristic data for formatting alarms tailored to respective devices.

Figure 2:
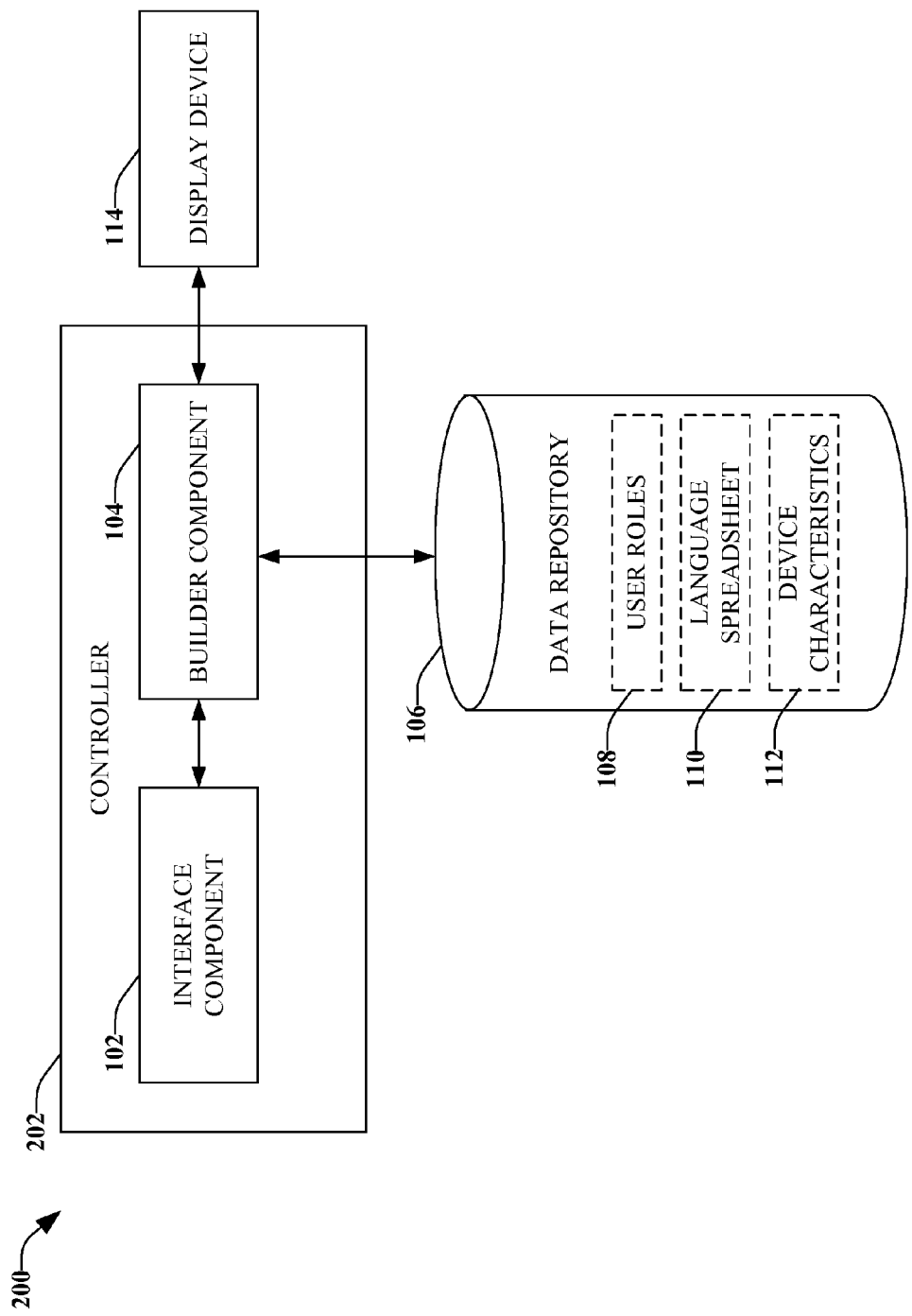
FIG. 2 illustrates an alarm configuration system employed with an industrial controller.

Referring now to FIG. 2, an industrial alarm generation system 200 is illustrated. The system 200 includes an industrial controller 202, which can be a logic controller, a robotic controller, or other suitable controller. The controller 202 includes the interface component 102 and the builder component 104. In other words, rather than an alarm being generated at a higher level system, the controller 202 can create and package alarms. For instance, the controller 202 can continuously monitor and analyze inputs (sensors) associated with an industrial operation for particular events that give rise to an alarm, such as process variables being outside a certain threshold, a user undertaking particular action, etc. When an event that gives rise to an alarm is detected, an instruction to generate an alarm is sent to the interface component 102. Such instruction can be received internal to the controller 202. The builder component 104 receives alarm instruction from the interface component 102 and generates an alarm. Based on the alarm instruction, the builder component 104 can retrieve related data from the data repository 106. For instance, an instruction to send an alarm regarding a DC motor error can be received by the builder component 104. The builder component 104 then retrieves relevant data from the data repository 108, which can be located in a local location, locally, centralized with respect to several controllers, etc.

The builder component 104 can access the user role data 108 to determine recipients associated with the alarm. In this example, related personnel such as process engineers, maintenance technicians and operators may desirably be notified of the DC motor error. The builder component 104 can then customize the alarm for each recipient. In another example, an alarm directed to a process engineer can be formatted to contain detailed technical information regarding a manufacturing process. The builder component 104 can also determine from the user roles data 108 that this particular process engineer prefers to receive alarms from his PDA by the way of a flashing LED. The builder component 104 can additionally access the device characteristics data 112 for compatible format required for the particular model of PDA carried by the process engineer. An alarm customized in a preferred format and language and packaged for a preferred recipient device then can be provided to the process engineer. Thus, the customized alarm can be delivered to the preferred recipient device in a customized and timely manner.

Figure 3:
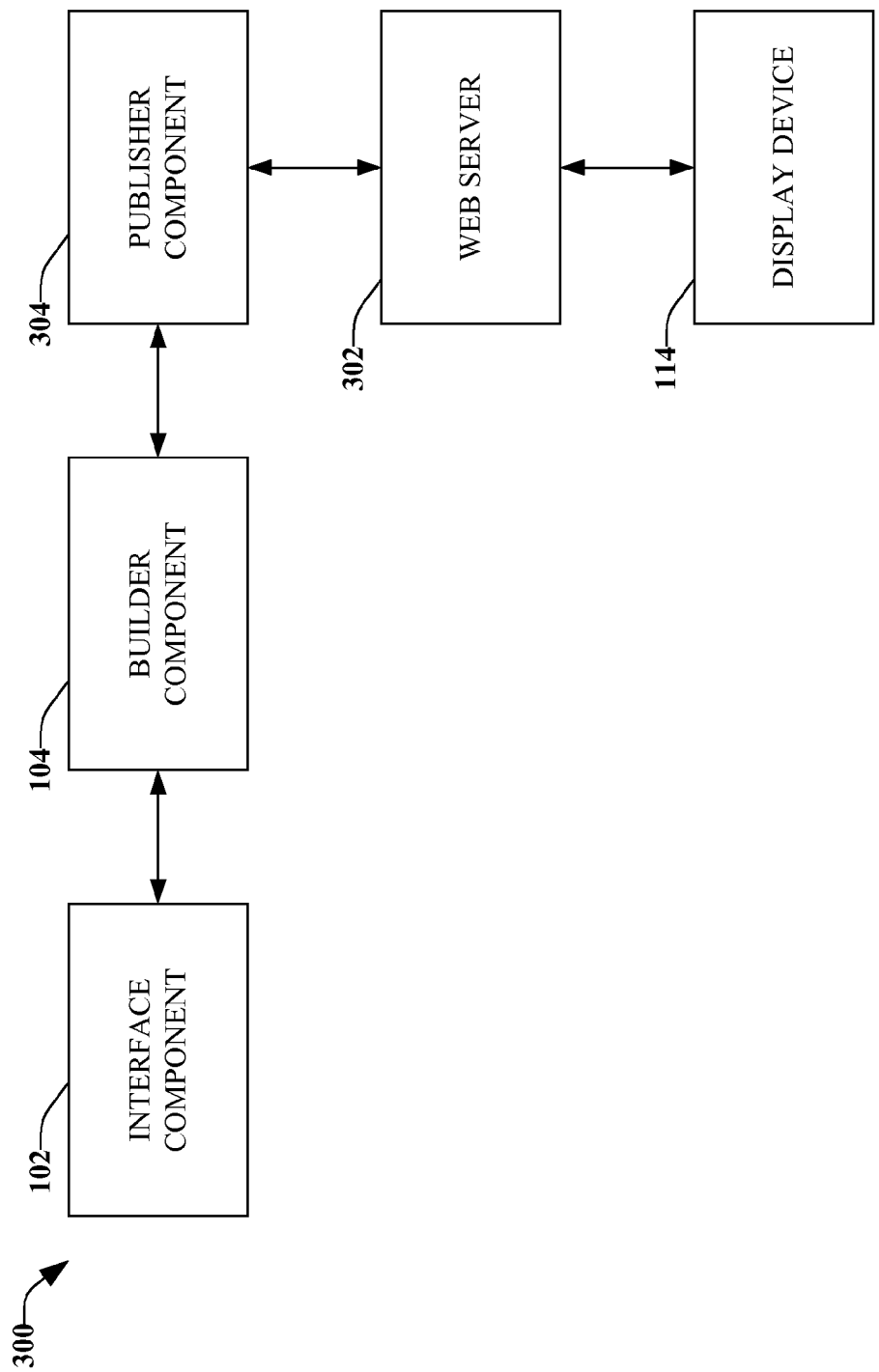
FIG. 3 illustrates an alarm configuration system coupled with a web server for internet/network communication.

Referring now to FIG. 3, a system 300 for providing a customized alarm to a user by way of the Internet is illustrated. The system 300 includes the interface component 102 that receives instructions to create an alarm. The builder component 104 is communicatively coupled to the interface component 102 and creates an alarm that is customized for an intended recipient of the alarm. More particularly, the builder component 104 can customize the alarm so that it is provided to an intended recipient in a certain language. The builder component 104 can be communicatively coupled to a web server 302 through a publisher component 304. Thus, a customized alarm generated by the builder component 104 can be packaged by the publisher component 302 for delivery to the web server 304. The web server 304 provides access to an intranet or the Internet, thereby enabling alarms to be delivered to display devices with networking capabilities. Additionally, the inventors have contemplated use of cellular infrastructure devices to provide customized alarms to a user. In an example, a traveling corporate CEO may receive an important alarm by way of the web server through a personal digital assistant (PDA) that has access to the World Wide Web. Similarly, virtual operators (e.g., operators that work from remote locations) can receive alarms through personal computers that have access to the Internet.

Figure 4:
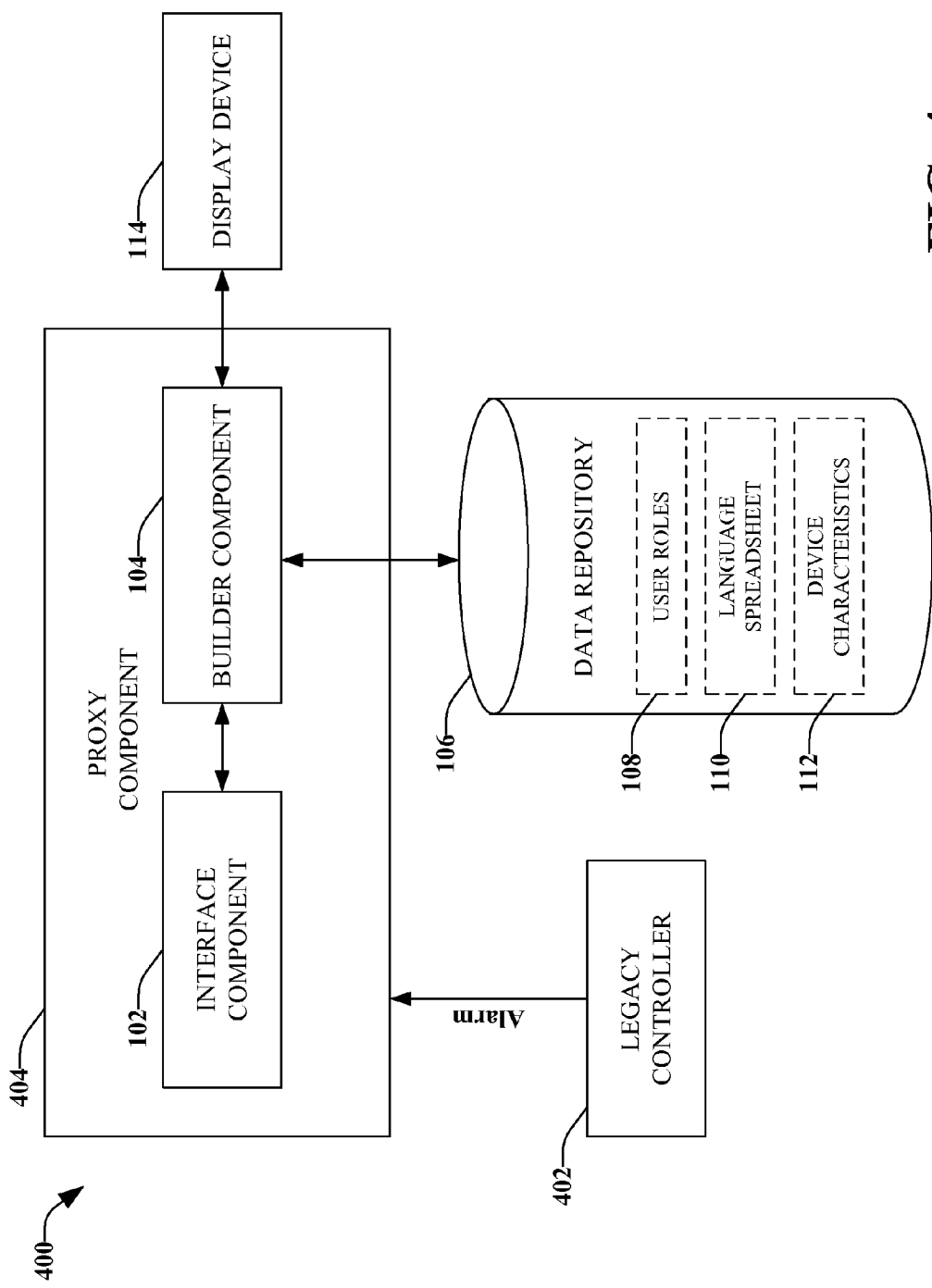
FIG. 4 illustrates a legacy controller coupled to a proxy component that employs an alarm configuration system.

Referring now to FIG. 4, a system 400 that facilitates configuration of an alarm is illustrated. The system 400 includes a legacy controller 402, which can provide a proxy component 404 with data that is produced or consumed by such controller 402. Pursuant to an example, the legacy controller 402 can be incapable of generating alarms. Alternatively, the controller 402 can create alarms, but such alarms are static and cannot be customized depending upon a user or current context. The system 400 includes a proxy component 404, which can be communicatively coupled to the legacy controller 402 such that the proxy component 404 and the legacy controller 402 act in conjunction as a single logical unit. For example, the proxy component 404 can be hardware that is communicatively coupled to the legacy controller 402.

Moreover, the proxy component 404 can be resident within a network infrastructure device, such as a switch, a router, and/or the like.

Through utilization of the proxy component 404, industrial automation operations utilizing legacy controllers can be upgraded to perform dynamic notification configuration. In order to upgrade an automation operation for dynamic alarm generation within controllers, most controllers within an automation operation including legacy controllers would need to be replaced to enable customized alarm provision. This upgrade could be costly and time consuming. Instead of upgrading most or the entire automation operation, the proxy component 404 can be implemented to save cost and time and still achieve the advantages of dynamic alarm configuration. The proxy component 404 can include the interface component 102 and the builder component 104, and can receive alarms or data that would cause an alarm from the legacy controller 402. In a particular example, the legacy controller 402 can create a "generic" alarm that would conventionally be provided to each recipient of an alarm associated with the legacy controller 402. Generic alarms can serve as instructions for dynamically configuring alarms. As noted above, the interface component 102 can receive instructions such as generic alarms generated by the legacy controller 402, and the builder component 104 can dynamically format and package alarms for delivery to related personnel in a customized and timely manner. As an example, a generic alarm "safety switch tripped" may be generated by the legacy controller 402. The generic alarm can be sent to the proxy component 404, which can interpret the generic alarm as an instruction for dynamic alarm generation/configuration. Dynamic alarms can then be generated in real time by the builder component 104 according to the instruction and related data retrieved from the data repository 106. Custom formatted and packaged alarms can then be delivered to intended recipients. For instance, an alarm such as: "Caution: safety switch located in B shop has been tripped at 9:42 am. Please notify all B shop personnel accordingly or evacuate B shop work area if necessary!" can be sent to a pager of a B shop supervisor who is in charge of the 8:00 a.m. to 4:00 p.m. shift. Another alarm generated from the same instruction can also be delivered to a public announcement system in B shop where the alarm can be publicly announced to notify all personnel currently working in B shop.

Figure 5:
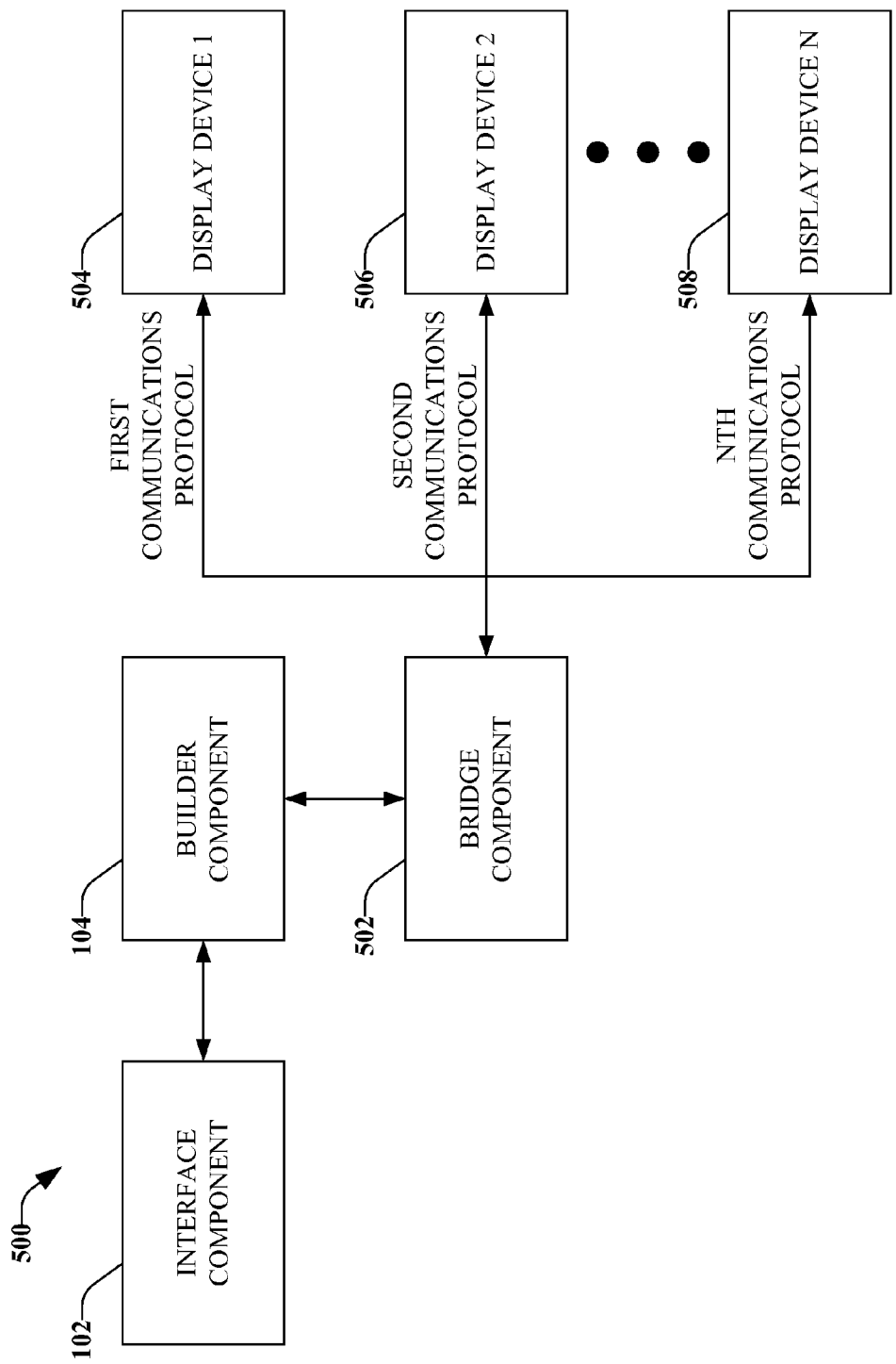
FIG. 5 illustrates an alarm configuration system connected to a remote publisher component for communication through a plurality of networks.

Referring now to FIG. 5, a system 500 that facilitates provision of alarms to various devices by way of several different network protocols is illustrated. The system 500 includes the interface component 102 that receives instructions to generate an alarm. The builder component 104 can then be employed to build a customized alarm with respect to a desired recipient, including formatting the alarm with respect to a particular language. Additionally, the alarm can be provided to a display device with Unicode strings therein, and the display device can employ a web browser or other program to graphically render text and/or symbols in a desired language. The builder component 104 can be communicatively coupled to a bridge component 502 that is utilized to format or package the alarm according to a communication protocol associated with an intended display device. Pursuant to an example, customized alarms may be desirably provided to a first display device 504 over a first communications protocol (e.g., DeviceNet), a second display device 506 over a second communications protocol (e.g., ProfiBus), and a third display device 508 over a third communications protocol (e.g., FieldBus). In many manufacturing environments, different devices are provided by various manufacturers, wherein the devices are configured to produce and consume data over different communications protocols (e.g., proprietary protocols). The bridge component 502 can enable alarms generated by a field device to be provided to several different devices over various communications protocols.

Pursuant to an example, the builder component 104 can be resident within a logic controller that is configured to receive, interpret, and produce data in accordance with a particular communications protocol. Thus, the builder component 104 can create alarms that conform to such protocol. The bridge component 502 receives such alarm and determines communications protocols utilized by devices with respect to which alarms are intended. The bridge component 502 then packages the alarms so that they can be received and interpreted by the display devices 504-508, respectively.

Referring collectively to FIGS. 6 and 7, example alarms that can be displayed on a human-machine interface (HMI) are illustrated. Turning specifically to FIG. 6, an example alarm 600 is illustrated, wherein the alarm is shown to a user in an English language, associated with a timestamp that accords to a user's current location, with content formatted for a particular display device. Now referring to FIG. 7, an example alarm 700 is illustrated, wherein the alarm 700 includes symbols and/or text in Japanese and is associated with a timestamp that accords to a certain time zone.

Figure 8:
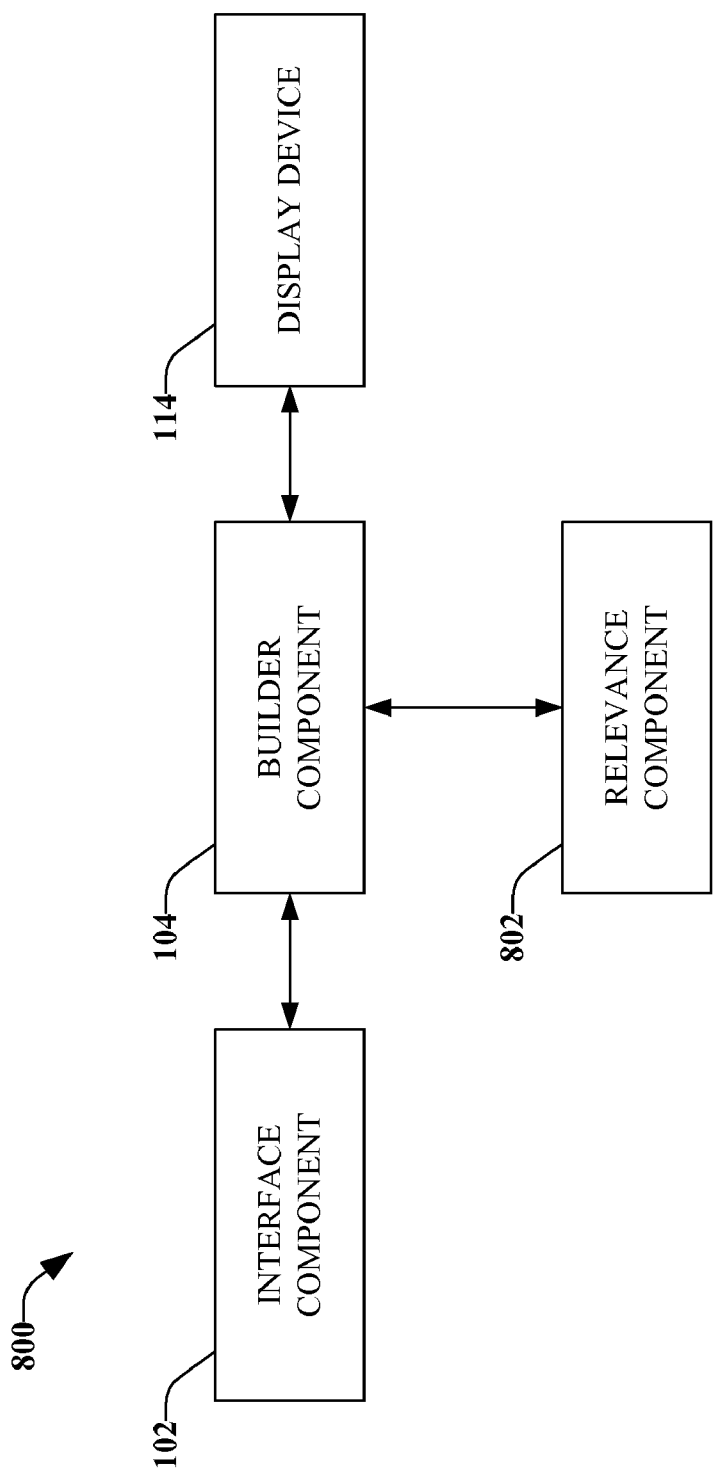
FIG. 8 illustrates an alarm configuration system utilizing a relevance component.

Referring now to FIG. 8, a system 800 for determining priority of an alarm is illustrated. The system 800 includes the interface component 102 and the builder component 104, which operate as described above. The system 800 additionally comprises a relevance component 802, which can intelligently prioritize and select alarms in real time for delivering relevant alarms to appropriate recipients in a timely manner based on the corporate function of the recipient, the priority of the alarms, time-sensitivity of the alarms . . . etc. For example, an instruction to generate alarms with regard to a broken motor on a production floor is received by the builder component 104. The relevance component 802 can intelligently select appropriate recipients such as the production engineer, maintenance personnel or other relevant personnel who need to be informed of the motor problem. On the other hand, the relevance component 802 can determine that the alarm regarding the motor problem should not be delivered to the corporate CEO. Thus, each person in the corporation receives only relevant alarms pertaining to his/her job function.

In addition, the relevance component 802 can also dynamically prioritize alarms in real time with respect to the time-sensibility of alarms. The priority of an alarm can increase or decrease with respect to time. For example, an alarm pertaining to an overdue machine maintenance task will increase in priority as time passes because the risk of machine malfunction increases over time if no maintenance is performed. Thus, the relevance component 802 can increase the priority of alarms for notifying maintenance personnel as time passes. Moreover, the relevance component 802 can cause the format of high priority alarms to be presented with increased emphasis. The relevance component 802 can also increase the frequency of alarms presented to the relevant personnel for alarms with higher priority. Further, the relevance component 802 can delay the delivery of alarms with lower priority to allow speedy delivery of alarms with comparatively higher priority to recipients. It can be appreciated that other benefits derived from the prioritization of alarms can also be implemented.

Moreover, the relevance component 802 can dynamically prioritize alarms according to responses from recipients with respect to previous alarms. For instance, as a deadline approaches and a recipient fails to respond to previous alarms accordingly, the relevance component 802 can increase the priority of an associated alarm and cause alarms formatted in higher urgency to be delivered. The relevance component 802 can also instruct the builder component 104 to generate and deliver another alarm to inform the recipient's superior if the alarm priority reaches a threshold and the recipient fails to respond. Thus, the relevance component 802 can intelligently determine the priority of alarms and enable the alarms to be delivered to relevant recipients in a customized and responsive manner.

Figure 9:
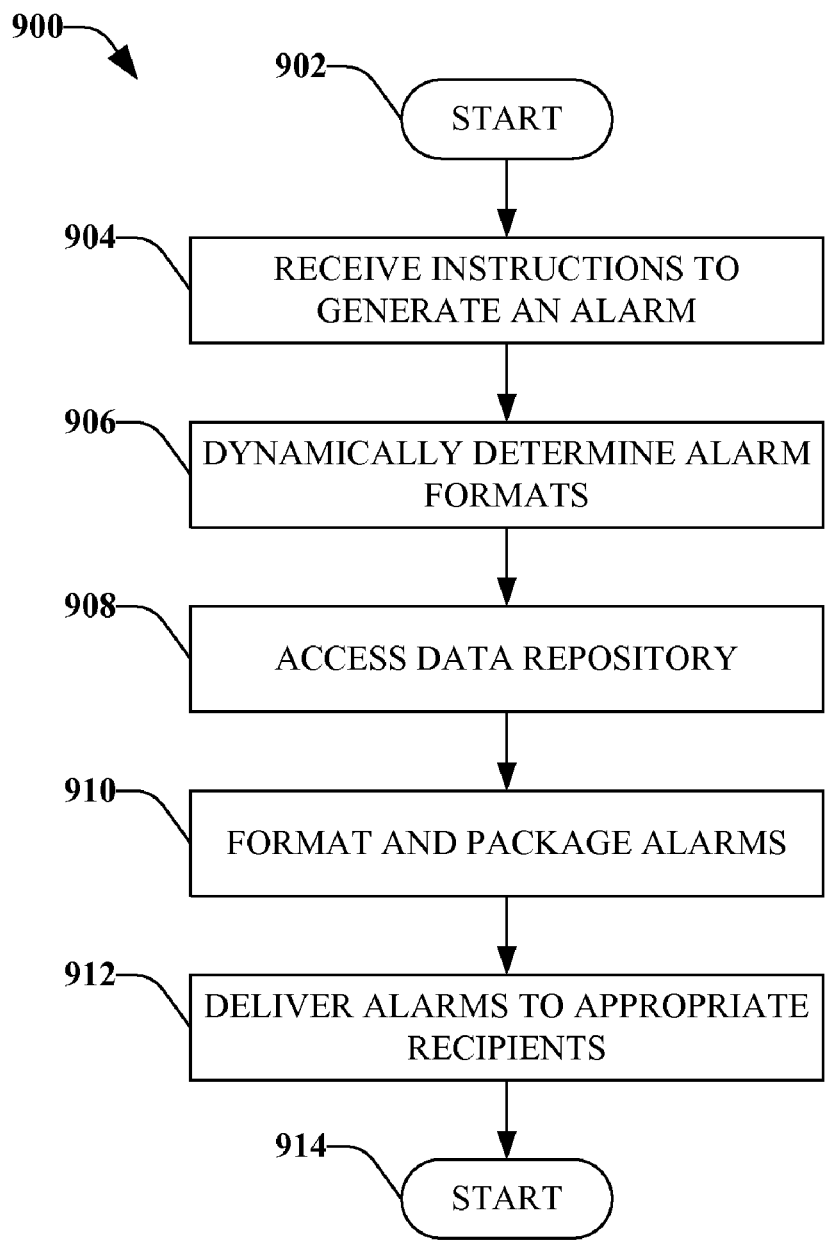
FIG. 9 is a representative flow diagram of a methodology for automatically and dynamically generating alarms/messages in an industrial environment.
Figure 10:
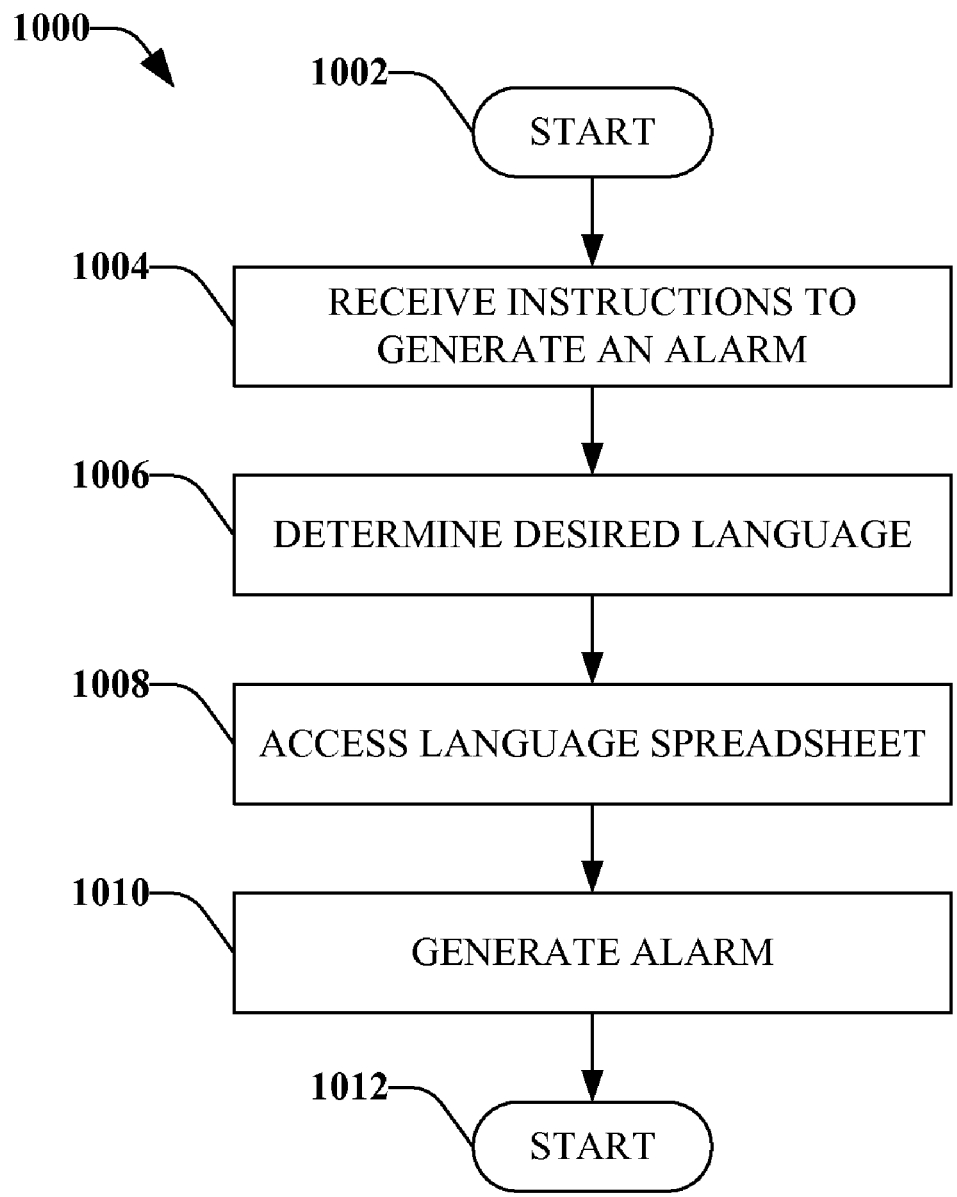
FIG. 10 is a representative flow diagram of a methodology for generating an alarm in a particular language.

Referring to FIGS. 9 and 10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference to FIG. 9, a methodology 900 for dynamically generating alarms in real time is illustrated. The methodology starts at 902, and at 904 instructions to generate an alarm are received. At 906, a determination can be made with regard to the formats and styles of the alarms to be generated. For instance, an instruction can be received to generate an alarm for a French-specking operator located in Japan—thus, it can be determined that an alarm in French formatted for a time zone associated with Japan is desirably provided. Additionally, it can be determined that content should be customized for the operator given his role in an organization, security privileges, geographic location, and the like. At 908, a data repository is accessed to retrieve related information such as French language format from a language spreadsheet, operator level technical data, Japanese time stamp, etc. The information retrieved from the data repository can then be utilized to dynamically format and package alarms at 910. At 912, the packaged alarm can then be delivered to appropriate recipients, and the methodology 900 completes at 914.

Now turning to FIG. 10, a methodology 1000 for providing an alarm in a desired format is illustrated. The methodology 1000 initiates at 1002, and at 1004 instructions to generate an alarm are received. At 1006, a desired language with respect to text and/or symbols within the alarm are determined. For example, this determination can be undertaken by analyzing a profile associated with a user that is to receive the alarm. At 1008, a language spreadsheet is accessed, and at 1010 an alarm is generated, wherein text and/or symbols therein can be displayed to the user in an appropriate language. Pursuant to another example, Unicode strings can be associated with the alarm and a web browser or other program can be utilized to graphically render text and/or symbols. The methodology 1000 completes at 1012.

Figure 11:
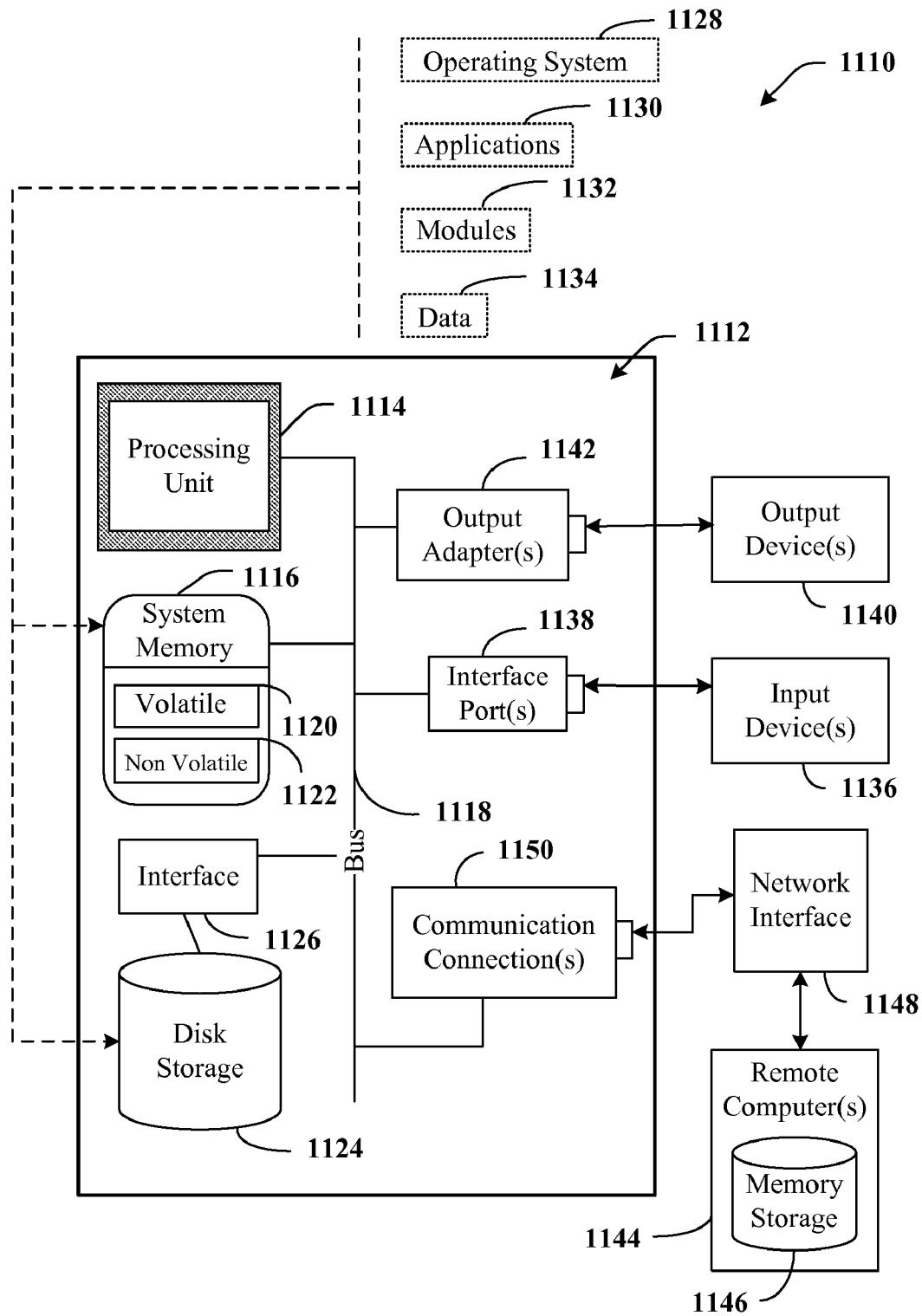
FIG. 11 is an example computing environment.

With reference to FIG. 11, an example environment 1110 for implementing various aspects of the claimed subject matter, including dynamically generating alarms in real time, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
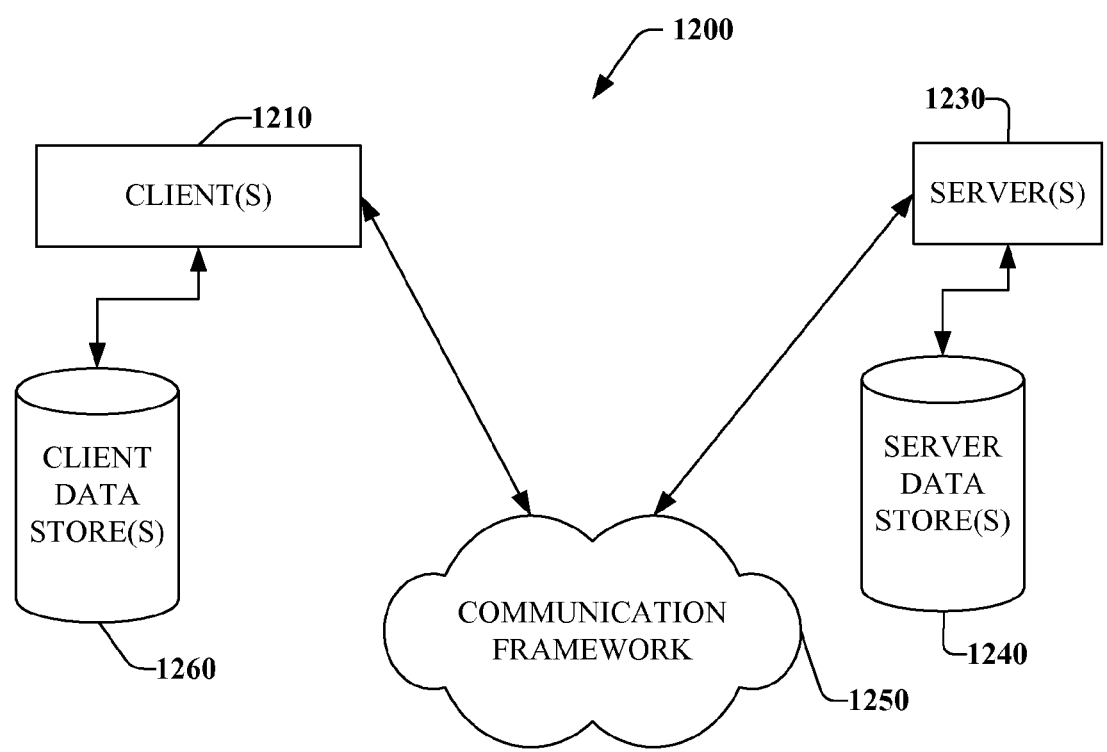
FIG. 12 is an example networking environment.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An alarm configuration system, comprising:
   an interface component that receives instructions to generate an alarm associated with one or more industrial process in an industrial control system;
   a builder component that creates the alarm in a customized manner based at least in part upon at least one of user role, preferred language, or parameters associated with a display device that is determined to receive the alarm; and
   a relevance component that prioritizes alarms based at least in part on at least one of time sensitivity of alarms, user response to prior alarms, urgency of associated events, or current time.

2. The alarm configuration system of claim 1, wherein a controller comprises the interface component and the builder component.

3. The alarm configuration system of claim 2, wherein the controller is at least one of a logic controller or a robotic controller.

4. The alarm configuration system of claim 1, wherein the interface component receives the instructions from at least one of a sensor, a controller, a high-level system, a device or entity.

5. The alarm configuration system of claim 1, wherein creating the alarm in a customized manner includes at least one of formatting in color, language, graphic presentation, device display format, content, degree of detail, geographic location, time zone, or recipient personalization.

6. The alarm configuration system of claim 1, wherein the builder component customizes alarms in real time.

7. The alarm configuration system of claim 1, wherein the relevance component selects additional recipients of alarms according to the priority of the alarms.

8. The alarm configuration system of claim 1 further comprising a bridge component that formats the alarm to accord to a communications protocol that is associated with the display device.

9. The alarm configuration system of claim 1, further comprising a publisher component that packages the alarm and delivers the alarm to a web server.

10. The alarm configuration system of claim 1, wherein the alarm includes Unicode strings.

11. The alarm configuration system of claim 1, further comprising, a proxy component that includes the interface component and the builder component, the proxy component is communicatively coupled to a controller.

12. The alarm configuration system of claim 11, wherein the proxy component resides within a network infrastructure device.

13. A methodology for automatically and dynamically generating alarms in an industrial control environment, comprising:
- receiving instructions for generating an alarm associated with an industrial process in an industrial control system;
- analyzing information relating to at least one of a user or a display device associated with the user to which the alarm is to be provided, the information including at least one of user role, preferred language, or parameters associated with the display device;
- customizing the alarm based upon the analysis; and
- prioritizing the alarm based at least in part on at least one of time sensitivity of the alarm, user response to prior alarms, urgency of associated events, or current time.

14. The methodology of claim 13, further comprising:
- determining a network protocol associated with the display device;
- packaging information associated with the alarm in a manner conforming with the network protocol; and
- transporting the information associated with the alarm to the display device over the network.

15. The methodology of claim 13, further comprising including Unicode strings within the alarm.

16. The methodology of claim 13, further comprising accessing a language spreadsheet when creating the alarm in a desired language.

17. The methodology of claim 13, further comprising creating the alarm in several formats for a plurality of intended recipients.

18. A system that facilitates dynamic generation of alarms associated with one or more industrial process in an industrial control environment, in real time, comprising:
- means for receiving instructions associated with generating an alarm;
- means for creating a customized alarm by analyzing information associated with an intended recipient of the alarm, the information includes at least one of recipient role, preferred language, or parameters associated with a display device that is determined to receive the alarm; and
- means for prioritizing the alarm based at least in part on at least one of time sensitivity of the alarm, user response to prior alarms, urgency of associated events or current time.

* * * * *

UNITED STATES PATENT AND TRADEMARK OFFICE
CERTIFICATE OF CORRECTION

| | |
|---|---|
| PATENT NO. | : 7,612,661 B1 |
| APPLICATION NO. | : 11/537239 |
| DATED | : November 3, 2009 |
| INVENTOR(S) | : Johnson et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this

Nineteenth Day of October, 2010

David J. Kappos
*Director of the United States Patent and Trademark Office*